(12) United States Patent
Daoud

(10) Patent No.: US 6,860,661 B1
(45) Date of Patent: Mar. 1, 2005

(54) ERGONOMIC KEYBOARD

(76) Inventor: Deeb Daoud, 16a Anlievitch st., Haifa 35025 (IL)

( * ) Notice: Subject to any disclaimer, the term of this patent is extended or adjusted under 35 U.S.C. 154(b) by 63 days.

(21) Appl. No.: 10/041,824

(22) Filed: Jan. 7, 2002

(30) Foreign Application Priority Data

Jan. 24, 2001 (IL) ............................................. 141069

(51) Int. Cl.[7] ............................................. G06F 3/023
(52) U.S. Cl. ........................................ 400/488; 400/489
(58) Field of Search .............................. 400/486, 487, 400/488, 489, 82

(56) References Cited

U.S. PATENT DOCUMENTS

| | | | | |
|---|---|---|---|---|
| 3,428,747 A | * | 2/1969 | Alferieff ................... 178/17 R |
| 5,178,477 A | * | 1/1993 | Gambaro .................... 400/489 |
| 5,270,709 A | * | 12/1993 | Niklsbacher ................. 341/20 |
| 5,788,386 A | * | 8/1998 | Hayashi et al. ............. 400/489 |
| 5,892,499 A | * | 4/1999 | Vulk, Jr. ..................... 345/156 |

FOREIGN PATENT DOCUMENTS

| FR | 2777222 A1 | * | 10/1999 | .............. B41J/5/10 |
|---|---|---|---|---|
| GB | 2131746 A | * | 6/1984 | .............. B41J/5/10 |

* cited by examiner

*Primary Examiner*—Daniel J. Colilla
(74) *Attorney, Agent, or Firm*—William H. Dippert; Reed Smith LLP

(57) ABSTRACT

An ergonomic keyboard providing support for the palms and fingers of a user. The ergonomic keyboard comprises a plurality of surfaces of different elevations, the surface of highest elevation adapted to support the palms so that the thumbs are separated from the rest of the fingers that are positioned on a distal side of the ergonomic keyboard. At least one surface of the plurality of surfaces is located on the distal side and at least one surface of the plurality of surfaces is located on the side where the thumbs are positioned, at least one of the plurality of surfaces is provided with at least one key.

16 Claims, 4 Drawing Sheets

ERGONOMIC KEYBOARD

FIELD OF THE INVENTION

The present invention relates to keyboards. More particularly, the present invention relates to ergonomic keyboards that is used with computers, data input electronic devices and the like.

BACKGROUND OF THE INVENTION

The massive use of electronic devices such as electronic typewriters, computer keyboards or other data input electronic devices has brought about health problems that are associated with enormous amount of tiny and repeated motions of the wrists and the fingers of the user. Common complains that keyboard users mention include muscular fatigue, muscular dysfunction, rheumatic joint and tendon pains, numbness, tingling and sensation of burning.

Since the 1980's there are compelling evidences to the causative relationship between using keyboards, commutative trauma disorders (CTD's) and repetitive strain injuries (RSI's) such as carpal tunnel syndrome or flexor tendinitis.

RSI's and CTD's have three major causative mechanisms:
1. Muscular fatigue that results from isometric contraction. This usually affects the muscles in the back of the neck, the shoulder girdle, the anterior wall of the chest, the arms and the foreaems.
2. Compressive syndromes including traction and compression of nerves that their roots arise from the spine, nerve terminals median nerves that pass through the wrist in the carpal tunnel.
3. Overuse of tendons and tendon's sheaths reduces lubrication of these adjacent and integral tissues, thus bringing about rheumatic tendinitis that causes pain and dysfunction.

Over the years, RSI's had spread from being an occupational hazard of professional users of keyboards and typists to lay people that use computers and enjoy browsing the web or chatting through e-mail. RSI's, whether from clicking the mouse or cocking the wrists left or right to reach for keys, is the major cause for the pursuit after ergonomic solutions.

The ergonomic solutions, in general, try to lessen the degree of ulnar deviation, shoulders and arms pinching, horizontally fixing the forearms in air and pressing the median nerve against the bony structure of the carpal tunnel. Patented ergonomic keyboards that maintain the standard arrangement of the usual keyboards are known in the art. An example is disclosed in U.S. Pat. No. 5,826,992 "Ergonomic Keyboard with Wrist Support" by Camacho and Granadino (1998). This ergonomic keyboard is provided with a top surface and a bottom surface and a front edge closer to the user, and a plurality of keys arranged in a plurality of adjacent rows. Each row includes a central arcuate portion, a left portion, and a right portion. The left and right portions extend tangentially from the arcuate portions. A wrist support extends along the front edge and a pair of legs pivotally mounted to the bottom surface elevate the wrist support from an underlying support surface. Another example of an arcuate keyboard is disclosed in U.S. Pat. No. 5,397,189 "Non-Planar Ergonomic Keyboard" by Minogue (1995). This ergonomic keyboard provides improved user comfort while maintaining a configuration sufficiently close to conventional keyboard. The keyboard is arcuate, with central keys situated closer to the user, and sloped in two directions. These ergonomic keyboards mean to lessen the fixation of the users forearms horizontally in air.

Other keyboards maintain also the QWERTY layout of the keys but divide the keyboard to two zones. Each zone is designated for each arm so that the wrists may be placed more conveniently. One example is disclosed in U.S. Pat. No. 5,372,441 "Ergonomic Keyboard Apparatus with Left and Right Key Section Separated by an Irregularly Shaped Space", by Louis (1994). This patent discloses keyboard arrangement with a pair of angular disposed, spaced apart groups of character key dedicated for operating use respectively by the left hand and the right hand of a user. Another example of separated rather than spaced keys is disclosed in U.S. Pat. No. 5,612,691 titled "Ergonomic Keyboard" by Frank and Murmann (1997). This ergonomic keyboard comprises at least two housing sections with separate key pads wherein the two housing sections are interconnected by a joint permitting pivoting and also tilting of the two housing sections relative to each other. The user may pivot the housings to a comfortable position. These ergonomic keyboards purport to lessen the degree of ulnar deviation.

Another ergonomic keyboard aimed to reduce the likelihood of repetitive stress injuries is disclosed in U.S. Pat. No. 5,426,449 titled "Pyramid Shaped Ergonomic Keyboard" by Danziger (1995). The pyramid ergonomic keyboard comprised of three sets of keys or three adjustable keypads. A front keypad faces the operator and contains number keys, function keys and some more. The left and right keypads are at approximately a 45 deg. angle positioned in a tripod fashion. The left and right keypads each contain the key in standard QWERTY layout. Handrests protrude between the front keypad and the side keypads to support the hands while typing.

Whether conventional or ergonomic keyboard, all keyboards invented and patented up today employ the upper limbs from the shoulder girdle down to the tips of the fingers. As such, the upper limb function is biomechanically divided into two parts:
1. a "stabilizing arm unit" consists of the muscles of the upper back and the base of the posterior neck, the shoulders, the arms and forearms, all supposed to impart fingers stability. Stabilizing the long articulated arm is guaranteed through pinching shoulders opposite to the back of the neck and the upper spine of the chest, pinching arms against the sides of the body, and bending the elbows into a continuously weight bearing position, horizontally bearing the forearms and palms.
2. "striking probes unit" consists of the fingers, which carry out the ultimate task of hitting very accurately the chosen key.

The wrists and fingers, backed up by the "stabilizing unit" through a flexible connection, use their natural movements of bending down towards the target key, key stroking one at the time. The thumbs usually employ only their up/down movements, neglecting their major movement, which is opposed to all other fingers as well as to the surface of the palm itself. In order to assure a better key stroking function, it is required to have a constantly stable "base" while the fingers are permanently moving, deviating and bending down. Moreover, one of the remain problems of the prior-art keyboards is that between strikes, the fingers are kept hanging over the keyboard in a stretched (overextended) and non-neutral position. In this position, the fingers have to be in an isometric contraction-demanding position, in order to avoid unwanted touch with the keys.

Regular keyboards encourage typist to twist and bend their hands in awkward positions that can add up to serious wrist injuries. Other contortion that may impose injury are combinations such as "function+control+key". These combined key strokes force stretching the fingers unnaturally and painfully while typing, especially when the hands are small.

Fixed position had been accused of being the underlying mechanism of RSI's. In light of the biomechanism of typing as explained herein before, it is understandable why the keyboard is the most criticized component of the computer. The so-called ergonomic solutions for keyboards take into account a few but not enough solutions to reduce the risks of RSI's. Such solutions include, among others, keeping the fingers relaxed and smoothly arched while typing keeping the wrists relaxed as possible since the nerves and tendons that control the finger's movements are passing through narrow tunnels in the wrist area, using both hands in order to click on keys combinations, and using splints, pads and other supporting devices. The ergonomic keyboards and the supporting devices do not truly offer a comprehensive solution to lessen RSI'S. There is still a need to overextend the fingers, especially when trying to reach the distal raw of keys, there is still a need to support the wrist directly against the carpal tunnel and the stabilizing unit (neck-shoulders, shoulders-arms, arms-wrists) is still doing the task of key striking through a stiff-fixed position, known as a major reason to fatigue and injury.

Another disadvantage of the conventional and ergonomic keyboard is that the distance between the key rows is fixed. Therefore, it is suitable for a certain hand size. However, there is a difference between the hand of a child, a grown man or a teenaged girl, for example. There is a need to adjust the keyboard so that the distance between the key rows may be changed according to the user's hand size.

BRIEF DESCRIPTION OF THE INVENTION

It is an object of the present invention to provide a keyboard that is ergonomic and diminishes markedly the risks stemming from enormous amount of tiny and repeating motions of the wrists and the fingers while using the keyboard.

It is another object of the present invention to provide an ergonomic keyboard that allows both hands to be constantly in a resting (but not fixed) position.

Yet, it is another object of the present invention to provide an ergonomic keyboard having an arched body that provides support to the middle part of the palm so that the strong joints of the metacarpal bones, the proximal phalanges of the fingers, and the arteries, veins and nerves passing through the carpal tunnel are protected from any pressure impact either from the palm or from the back of the hand.

It is a further object of the present invention to provide an ergonomic keyboard in which the wrists may bend in a natural position, and the thumbs are positioned in a natural position opposing the rest of the fingers.

It is yet another object of the present invention to provide an ergonomic keyboard that is provided with a non-key area in between the key rows, on which the fingers may rest between typing.

It is another object of the present invention to provide an ergonomic keyboard in which the distance between the key rows is adjustable and may be changes according to the size of the user's hands or the length of his fingers. The distance between the key rows is changed in order to provide the user with as much comfort as possible.

It is thus provided an ergonomic keyboard providing support for the palms and fingers of a user, said ergonomic keyboard comprising a plurality of surfaces of different elevations, the surface of highest elevation adapted to support the palms so that the thumbs are separated from the rest of the fingers that are positioned on a distal side of said ergonomic keyboard, at least one surface of said plurality of surfaces is located on said distal side and at least one surface of said plurality of surfaces is located on the side where the thumbs are positioned, at least one of said plurality of surfaces is provided with at least one key.

Furthermore, in accordance with another preferred embodiment of the present invention, at least one surface on said distal side is a key absent surface, said key absent surface is adapted to provide a resting area for the fingers.

Furthermore, in accordance with another preferred embodiment of the present invention, three of said plurality of surfaces on said distal side are elongated and are arranged in rows.

Furthermore, in accordance with another preferred embodiment of the present invention, said three of said plurality of surfaces are divided into two parts, each of the two parts is designated for the fingers of the user's single hand.

Furthermore, in accordance with another preferred embodiment of the present invention, said three of said plurality of surfaces are provided with alphanumeric keys, said alphanumeric keys are arranged in a standard keyboard layout.

Furthermore, in accordance with another preferred embodiment of the present invention, said standard keyboard format is a QWERTY layout.

Furthermore, in accordance with another preferred embodiment of the present invention, said standard keyboard format is a MALTRON layout.

Furthermore, in accordance with another preferred embodiment of the present invention, said standard keyboard format is a DVORAK layout.

Furthermore, in accordance with another preferred embodiment of the present invention, the surface of lowest elevation is the most distal row, wherein a middle row is raised by a riser above distal row and wherein an upper row is adjacent to said middle row.

Furthermore, in accordance with another preferred embodiment of the present invention, most distal row is inclined with a slope facing said middle row.

Furthermore, in accordance with another preferred embodiment of the present invention, said raiser and said middle row is inclined with a slope opposite to the slope of said most distal row, wherein the slope of said riser, which is adapted to provide a resting area for the user's fingers, is steeper than the slope of said middle row and wherein the slope of said upper row is steeper than the slope of said middle row.

Furthermore, in accordance with another preferred embodiment of the present invention, the surface of highest elevation is divided into two portions, each of the two portions is adapted to underpin the corresponding palm of the user.

Furthermore, in accordance with another preferred embodiment of the present invention, a detachable bridge is provided, upbridging a gap between the two portions, the gap adapted to accommodate the thumbs.

Furthermore, in accordance with another preferred embodiment of the present invention, said bridge is provided with a screen.

Furthermore, in accordance with another preferred embodiment of the present invention, surfaces defining said gap are provided with at least one key.

Furthermore, in accordance with another preferred embodiment of the present invention, one of said plurality of levels is a horizontal level that is situated on said distal side.

Furthermore, in accordance with another preferred embodiment of the present invention, said horizontal level is situated in between the two parts of said three of said plurality of surfaces.

Furthermore, in accordance with another preferred embodiment of the present invention, said horizontal level is higher than most distal level and middle level.

Furthermore, in accordance with another preferred embodiment of the present invention, said at least one surface of said plurality of surfaces that is located on the side where the thumbs are positioned, is at the same height as the height of said upper level.

Furthermore, in accordance with another preferred embodiment of the present invention, at least one surface from said plurality of surfaces is adapted to move horizontally.

Furthermore, in accordance with another preferred embodiment of the present invention, a leverage system is connected to said at least one surface from said plurality of surfaces, said leverage system is adapted to adjust the distance between said plurality of surfaces.

Furthermore, in accordance with another preferred embodiment of the present invention, at least one lever from said leverage system is connected to said most distal row, wherein at least one lever from said leverage system is connected to said middle row, wherein at least one lever from said leverage system is connected to said riser and wherein at least one lever from said leverage system is connected to said upper level.

Furthermore, in accordance with another preferred embodiment of the present invention, at least one key is provided on surfaces that are formed in between said plurality of surfaces of different elevations.

It is further provided an ergonomic keyboard providing support for the palms and fingers of a user, said ergonomic keyboard comprising a plurality of surfaces of different elevations, the surface of highest elevation adapted to support the palms so that the thumbs are separated from the rest of the fingers that are positioned on a distal side of said ergonomic keyboard, at least one surface from said plurality of surfaces is located on said distal side and at least one surface of said plurality of surfaces is located on the side where the thumbs are positioned, at least one of said plurality of surfaces is provided with at least one key, and wherein at least one surface of said plurality of surfaces is adapted to move in an inwardly and outwardly directions.

Finally, in accordance with another preferred embodiment of the present invention, a leverage system is connected to said at least one surface from said plurality of surfaces, said leverage system is adapted to adjust the distance between said plurality of surfaces.

DETAILED DESCRIPTION OF THE PRESENT INVENTION

The present invention provides a novel design for a keyboard that is used with computers, data input electronic devices and the like. Current designs and even patented ergonomic designs do not provide the solution for the harsh medical syndromes that evolve from massive use of electronic devices, hence use of keyboards. Medical syndromes such as carpal tunnel syndrome or flexor tendinitis are the outcome of enormously repeating tiny motions involved in using a keyboard.

Figure 1:
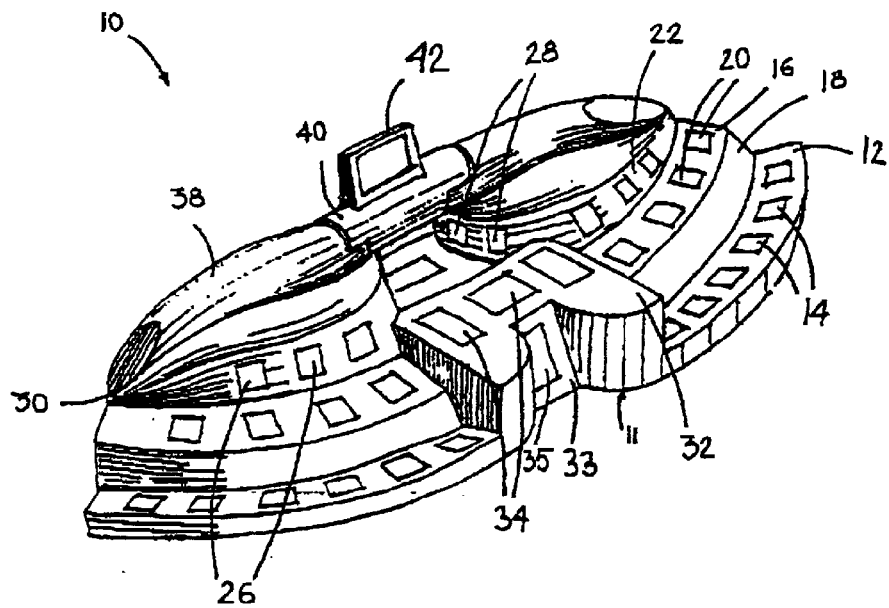
FIG. 1 illustrates an isometric view of the distal side of an ergonomic keyboard in accordance with a preferred embodiment of the present invention.

Reference is now made to FIG. 1 illustrating an isometric view of the distal side of an ergonomic keyboard in accordance with a preferred embodiment of the present invention. The ergonomic keyboard has an elongated and arched body 10 having elongated distal and a proximal sides and a straight base 11 at the bottom of the body. A user, when using the keyboard of the present invention, is siting in front of the keyboard facing its proximal side. Body 10 comprises five levels. Four levels are positioned on the distal side of body 10, each level is in a different elevation regarding the base of the body. The fifth level is positioned on the proximal side of body 10.

Most distal level 12 is the least elevated level. Distal level 12 is elongated and is divided into two parts, each part is designated for one hand of the user, therefore the general shape of each part of distal level 12 is a mirror reflection of the other part. Each part of distal level 12 is preferably provided with five keys 14 that are arranged in a row along the elongated axis of distal level 12. The surface of distal level 12 on which the keys are located is inclined toward the other levels of the keyboard's body, hence towards the user.

A middle level 16, which is higher than distal level 12, is positioned proximately and parallel to distal level 12. Riser 18 that elevates middle level 16 from distal level 12 is inclined and faces the key's surface of distal level 12. riser 18 has no keys and is designated to allow the user's finger tips to rest or relax on its inclined surface between typing. This feature solves the problems related to prior art keyboards in which the fingers are kept hanging over the keyboard in an overstretched position between typing. Middle level 16 is also inclined in the same direction as riser 18, but its slope is less pronounced than the slope of riser 18. Middle level 16 and riser 18 are both divided into two parts, similarly to distal level 12, each part is designated to each arm of the user. Middle level 16 preferably accommodates four keys 20 on each part of the level. The keys are preferably circular.

An upper level 22 is provided adjacent to middle level 16. The part of upper level 22 that is adjacent to middle level 16 is inclined with a slope similar to the slope of riser 18. As the former levels, upper level 22 is also divided into two parts. A gap is formed between the two parts of upper level 22 and each part of the two parts of level 22 is extending towards the proximal side of body 10 inwardly on both sides of this gap. This extension of upper level 22 is in fact a part of upper level 22 that is situated on the proximal side of body 10.

Figure 2:
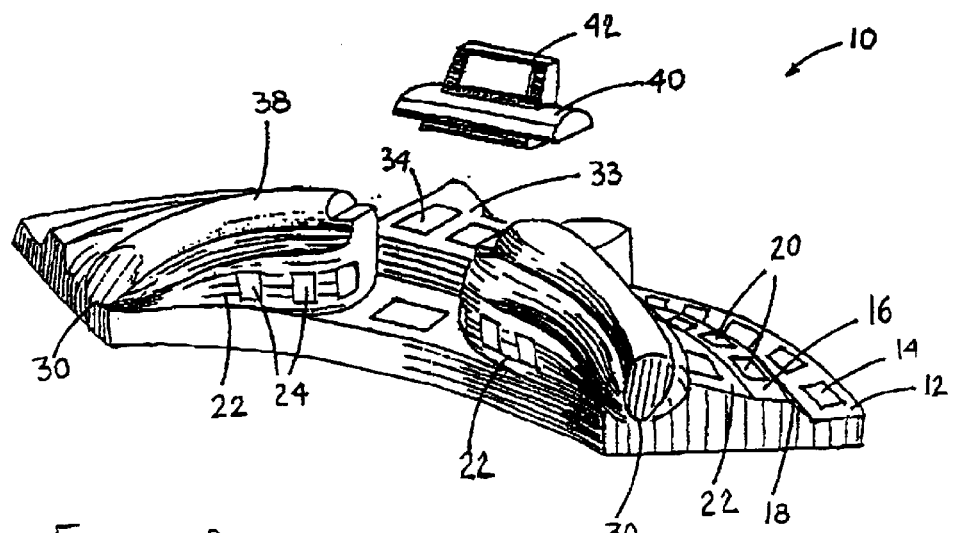
FIG. 2 illustrates an isometric view of the proximal side of the ergonomic keyboard shown in FIG. 1.

Reference is now made to FIG. 2 illustrating an isometric view of the proximal side of the ergonomic keyboard shown in FIG. 1. The extended part of upper level 22 on the proximal side of body 10 is clearly shown. Upper level 22 may accommodate keys on the distal side of body 10, on the proximal side of body 10 or on both sides of the gap between both parts of upper level 22. Keys 24, preferably circular, are provided on upper level 22, on the proximal side of the body and may be seen in FIG. 2. Keys 26 are provided on upper level 22, on the distal side of the body, and are shown in FIG. 1. This set of keys are in fact a third row of keys that adds up to a first row of keys accommodated on distal level 12 and to a second row of keys accommodated on middle level 16. Keys 28 are provided on upper level 22 on both sides of the gap between the two parts of upper level 22 and may be seen also in FIG. 1. The surface of upper level 22 that accommodates the keys has four ends, two ends on each end of body 10, in which the proximal and the distal sides of the body meet. The surface is reduced towards the ends so that both ends of the surface of each part of upper level 22 are joined in a common point 30 on both ends of body 10.

As mentioned, the main rows of keys are located on distal level 12 middle level 16 and upper level 22. The keys may be preferably arranged in a regular QWERTY layout.

A central level 32 is positioned substantially in the center of body 10, on its distal side, dividing distal level 12, riser 18 and middle level 16 into the two parts that were discussed herein above. Relative to base 11, the surface that accommodates keys 34 of central level 32 is higher then distal level 12 and middle level 16 and is substantially parallel to base 11. Central level 32 is provided with a notch 33 (can be better observed in FIG. 1) in its distal side. On the surface of notch 33 a few keys but preferably a key 35 that is not commonly used may be provided (escape, ON/OFF, etc.).

Figure 3A:
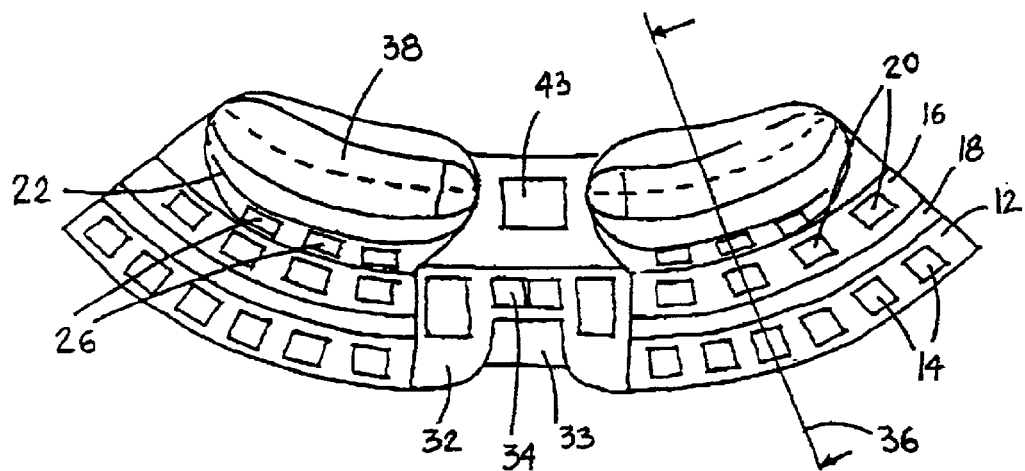
FIG. 3A illustrates an elevated view of the ergonomic keyboard shown in FIG. 2.
Figure 3B:
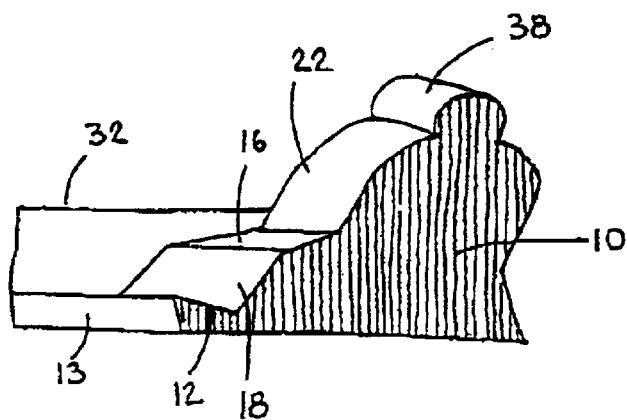
FIG. 3B illustrates a sectioned side view of the ergonomic keyboard shown in FIG. 2.

In order to better understand the three-dimensional structure of the ergonomic keyboard of the present invention and the slopes of its levels, reference is now made to FIGS. 3A and 3B. FIG. 3A illustrates an elevated view of the ergonomic keyboard shown in FIG. 2 and FIG. 3B illustrates a sectioned side view of the ergonomic keyboard shown in FIG. 2. The section is along the cut line 36 shown in FIG. 3A. The slopes of the levels relative to the straight base 11 of body 10 are clearly shown in FIG. 3B. Distal level is raised from base 11 by a riser 13. Riser 13 is substantially perpendicular to base 11. Distal level 12 has a slope that faces the other levels of the keyboard. Riser 18 has an opposite slope relative to the slope of distal level 12, however the slope of riser 18 is steeper.

The slope of middle level 16 is at the same direction as the slope of riser 18, however, the slope of middle level 16 is much smaller. The reason riser 18 is not perpendicular to base 11 is that the purpose of riser 18 in addition to rising middle level 16 above distal level 12 is to provide a resting strip to the fingers of the user between typing. Both parts of middle level 16, the part on the distal side of body 10 as well as the part on the proximal side of the body are of about the same slope.

Upper level 22 is adjacent to middle level 16 but it is much steeper than middle level 16. Relative to base 11, central level 32 is higher than distal level 12 and middle level 16, and is substantially parallel to base 11.

Returning to FIG. 2, on top of each part of the two parts of upper level 22, a shoulder 38 is provided. Shoulder 38 is elongated and arched in the same direction as body 10 and has a round cross section. The round cross section is shown clearly also in FIG. 3B. Each one of shoulders 38 is designated to provide an underpin to the palm of the user's hand. The middle part of the palm (the grooved part opposite to proximal knuckles) that rests on shoulder 38 has a thick layer of skin that covers structures such as the strong joints of the metacarpal (long) bones and the proximal phalanges of the fingers. Other structures that pass through the palm area are arteries, veins and nerves. In this part of the palm, these structures are simply protected by their location in the mid-position between the bones, far from any pressure impact, either from the palm or from the back of the hand. The ergonomic keyboard of the present invention offers double support to the arms that have to be in a "hanging-flouting" position over other keyboards. The shoulder girdle from behind and the resting midpalm over the keyboard (shoulder 38) share the weight of the "hanging" arms so that fatigue and discomfort that were the user's share in using prior art keyboards, are diminished.

Reference is now made to FIG. 3A illustrating an elevated view of the ergonomic keyboard shown in FIG. 2. On the surface between shoulders 38, another key 43 is provided. Key 43 may preferably be the space bar since as will be shown herein after, when the fingers are positioned correctly on the keyboard, the thumbs are positioned in the gap between both parts of upper level 22, which is above the surface between the shoulders. Since users of keyboards are already used to dick with their thumbs on the space bar, it is naturally to locate the space bar under the thumbs, hence key 43.

Returning to FIGS. 1 and 2, a bridge 40 is provided to be positioned between shoulders 38. Bridge 40 may be in a detached state, as shown in FIG. 2, and may bridge the gap between shoulders 38 as shown in FIG. 1. Bridge 40 is positioned between shoulders 38, up bridging the gap between both parts of upper level 22. Bridge 40 is preferably provided with a frame 42 that may be used as a screen that provides needed information about the computer or the keyboard.

Figure 4:
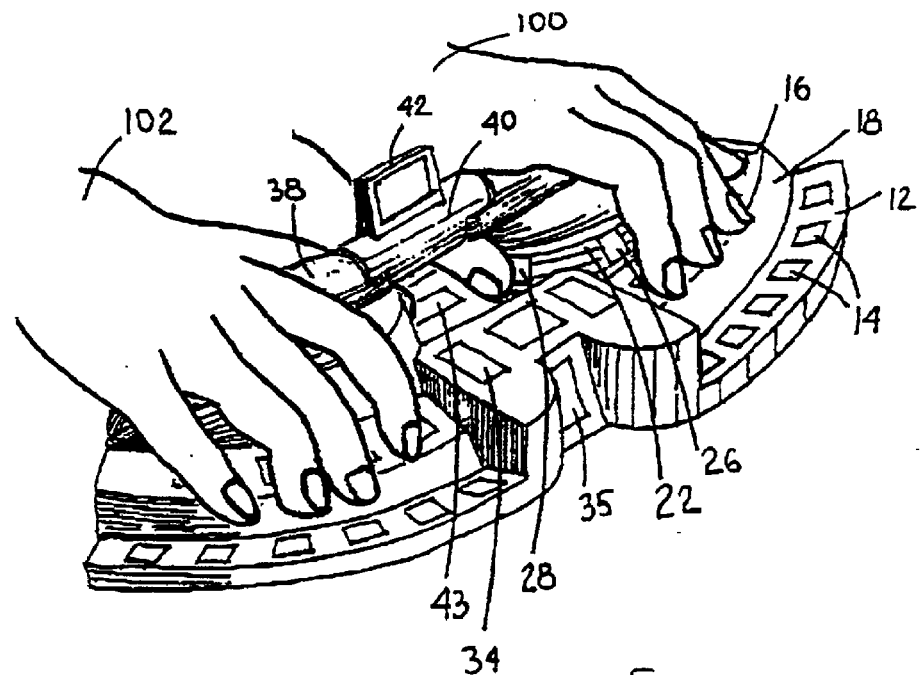
FIG. 4 illustrates an isometric view of the ergonomic keyboard shown in FIG. 1 while the position of the hands end fingers of a user on the keyboard is demonstrated.
Figure 5:
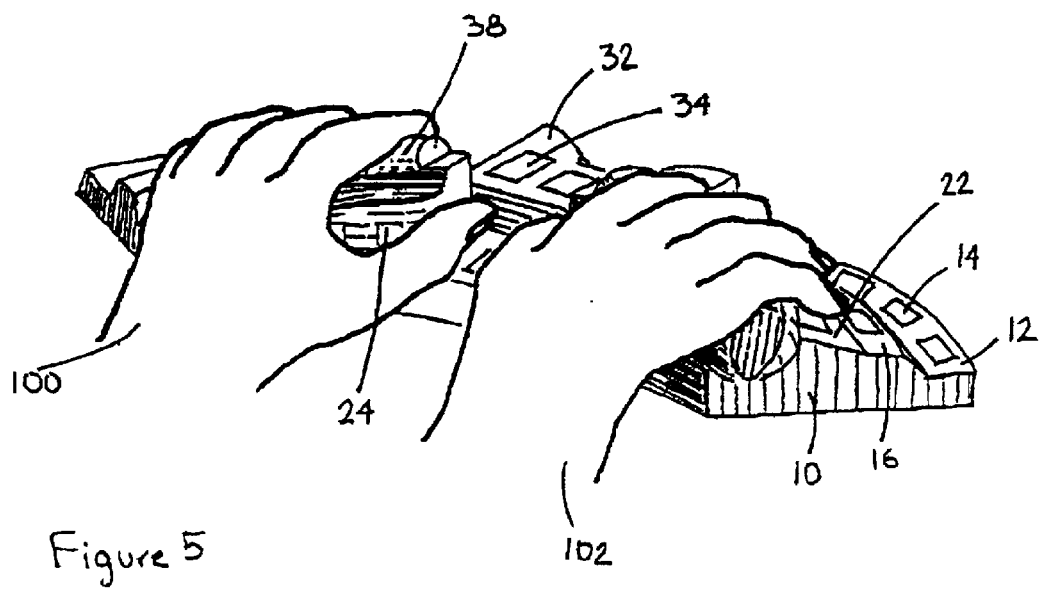
FIG. 5 illustrates an isometric view of the ergonomic keyboard shown in FIG. 2 while the position of the hands and fingers of a user on the keyboard is demonstrated

Reference is now made to FIGS. 4 and 5 illustrating an isometric view of the ergonomic keyboard shown in FIGS. 1 and 2, while the position of the hands and fingers of a user on the keyboard is demonstrated. In FIG. 4, the palm of a user's right hand 100 is supported on the corresponding side of shoulder 38 while four fingers except of the thumb are positioned on the right hand side of the distal part of body 10. The thumb is inserted in the gap between the two parts of upper level 22. The palm of the user's left hand 102 is supported on the corresponding part of shoulder 38 with the fingers positioned in the same manner as the fingers of the right hand. The proximal side of upper level 22 (on bottom of shoulder 32) is underpinning the mass of muscles in the base of the thumb of each hand.

The position of the hands on the ergonomic keyboard of the present invention is the most neutral and supported position, not similar to the position of the hands on any of the available keyboards. The fingers may rest on a resting strip, riser 18, between typing, an available feature that does not exist in any of the available keyboards, including the ergonomic ones. In the prior art keyboards, the fingers are kept free while resting without being supported between typing, a fact that impose additional strain on the palm's muscles. Riser 18 is located between distal level 12, middle level 16 and the part of upper level 22 that is situated on the distal side of body 10. Those levels accommodate the most commonly used keys. Therefore, the users fingers may reach any of those keys from the resting strip on which the fingers are naturally resting.

The thumbs that are kept in the gap between both part of upper level 22 may be used in order to activate keys 28 that are situated in the gap between the two parts of the upper level. In addition, the thumbs may be also used to activate keys 24 that are situated on the proximal part of upper level 22. This situation is better illustrated in FIG. 5. Moreover, as already mentioned, key 43, which is preferably used as a space bar, is situated on the surface between shoulders 38 so that the thumbs are naturally clicking the space bar beneath them.

FIG. 5 illustrates a similar position of the user's hands on the ergonomic keyboard as FIG. 4, however, bridge 40 is detached. Although bridge 40 is missing, the hands are kept in the same position as if the bridge is present.

Additional keys may be spread in any other way on the levels while keys that are hardly used may be positioned in areas where the hands do not reach naturally in order to keep the fingers close to the keys that are mostly in use. These mostly used keys are located far enough from other keys in order to prevent the user from mistakenly press the keys that are seldom used.

Figure 6:
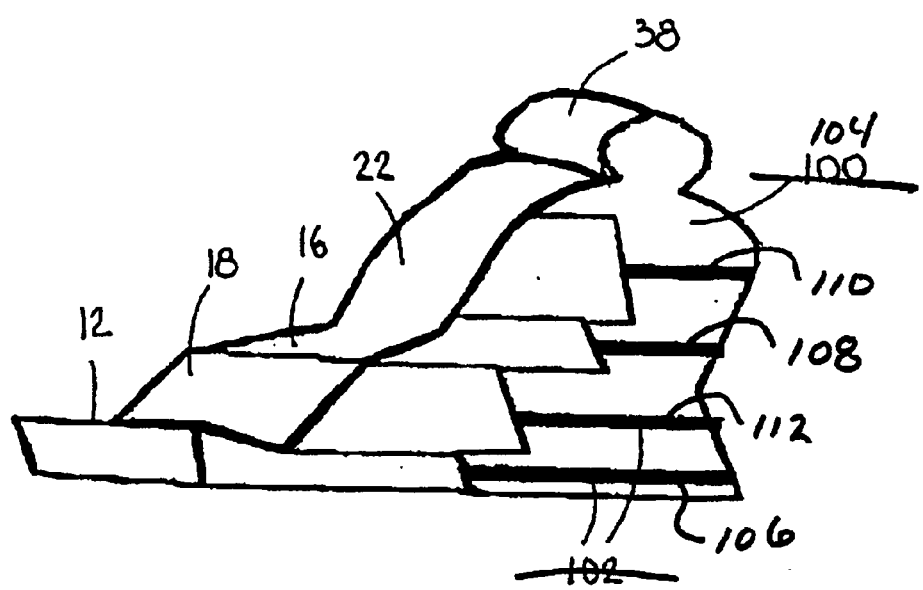
FIG. 6 illustrates a sectioned side view of an ergonomic keyboard in accordance with another preferred embodiment of the present invention.

Reference is now made to FIG. 6 illustrating a sectioned side view of an ergonomic keyboard in accordance with another preferred embodiment of the present invention. The general aspect of this embodiment is the same as the embodiments that are shown in the previous figures, however the unique feature of the embodiment shown in FIG. 6 is a leverage system that is installed in the interior of body 100.

The leverage system provides the user with the ability to change the distance between the levels on which the key rows are accommodated according to the physiological characteristics of the user. For example, an adult male has much bigger hand size than a child and needs a certain distance between the key rows in order to reach the keys in the most comfortable manner. If a child is using a keyboard that is adjusted to the adult male, he will have to vigorously move his hands and overstretch his fingers in order to reach the keys. The ability to bring the levels closer to each other prevents the child user from exerting additional force on his hands and fingers while using the keyboard. The ability to adjust the distance between the levels, hence between the key rows, enables any user having a specific hand size and finger length to use the same keyboard in maximum comfort.

The levels on the distal side of body 104 are sliding one on top of the other. Distance level 12 is attached to a lever 106 and may be moved inwardly and outwardly. In the same manner, middle level 16 and upper level 22 may be moved in an inward and outward directions by levers 108 and 110. Riser 18 may be also moved by lever 112. Each one of the levers has a fastening means (not shown in the Figure) that fastens and fixes the leverage system after adjusting the levels to a comfortable position by the user. The fastening means prevents the levels from sliding one on top of the other while the user uses the ergonomic keyboard.

It should be clear that the description of the embodiments and attached Figures set forth in this specification serves only for a better understanding of the invention, without limiting its scope as covered by the following claims.

It should also be clear that a person skilled in the art, after reading the present specification could make adjustments or amendments to the attached Figures and above described embodiments that would still be covered by the following claims.

What is claimed is:

1. An ergonomic keyboard providing support for the both palms and their fingers of a user, said ergonomic keyboard comprising a plurality of surfaces of different elevations, the surface of highest elevation, forming an elongated ridge, separating between a distal side and a proximal side of the keyboard, providing support across the palms, substantially below a fold line of the palms, which is defined when the fingers are flexed together towards the palms, so that when the palms are positioned over the keyboard the thumbs are separated by the elongated ridge from the rest of the fingers that are positioned over the distal side of said ergonomic keyboard, at least one surface of said plurality of surfaces being located on said distal side and at least one surface of said plurality of surfaces being located on the side where the thumbs are positioned, and at least one of said plurality of surfaces is provided with at least one key, wherein surfaces are located on said distal side, which are elongated and are arranged in rows.

2. The ergonomic keyboard as claimed in claim 1, wherein said three surfaces are divided into two parts, each of the two parts being designated for the fingers of each palm.

3. The ergonomic keyboard as claimed in claim 1, wherein said three of said plurality of surfaces are provided with alphanumeric keys, said alphanumeric keys being arranged in a standard keyboard layout.

4. The ergonomic keyboard as claimed in claim 3, wherein said standard keyboard layout is a QWERTY layout.

5. The ergonomic keyboard as claimed in claim 3, wherein said standard keyboard layout is a MALTRON layout.

6. The ergonomic keyboard as claimed in claim 3, wherein said standard keyboard layout is a DVORAK layout.

7. The ergonomic keyboard as claimed in claim 1, wherein the surface of lowest elevation is the most distal row, wherein a middle row is raised by a riser above said distal row and wherein an upper row is adjacent to said middle row.

8. The ergonomic keyboard as claimed in claim 7, wherein the most distal row is inclined with a slope facing said middle row.

9. The ergonomic keyboard as claimed in claim 7, wherein said riser and said middle row are inclined with a slope opposite to the slope of said most distal row, wherein the slope of said riser, which is adapted to provide a resting area for the user's fingers, is steeper than the slope of said middle row and wherein the slope of said upper row is steeper than the slope of said middle row.

10. The ergonomic keyboard as claimed in claim 1, wherein the surface of highest elevation is divided into two portions, each of the two portions being adapted to underpin the corresponding palm of the user.

11. The ergonomic keyboard as claimed in claim 10, wherein a detachable bridge is provided, facilitating, when removed, a gap between the two portions, the gap adapted to accommodate the thumbs.

12. The ergonomic keyboard as claimed in claim 11, wherein said bridge is provided with a screen.

13. The ergonomic keyboard as claimed in claim 11, wherein surfaces defining said gap are provided with at least one key.

14. The ergonomic keyboard as claimed in claim 1, wherein at least one surface from said plurality of surfaces is adapted to move horizontally and wherein a leverage system is connected to said at least one surface from said plurality of surfaces, said leverage system being adapted to adjust the distance between said plurality of surfaces.

15. The ergonomic keyboard as claimed in claim 14, wherein the surface of lowest elevation is the most distal row, wherein a middle row is raised by a riser above said distal row and wherein an upper row is adjacent to said middle row, and wherein at least one lever from said leverage system is connected to said most distal row, wherein at least one lever from said leverage system is connected to said middle row, wherein at least one lever from said leverage system is connected to said riser and wherein at least one lever from said leverage system is connected to said upper lever.

16. The ergonomic keyboard as claimed in claim 1, wherein a leverage system is connected to one of the surfaces, said leverage system being adapted to adjust the distance between surfaces.

* * * * *